(12) United States Patent
Maeda et al.

(10) Patent No.: US 10,793,030 B2
(45) Date of Patent: Oct. 6, 2020

(54) RECLINING DEVICE

(71) Applicant: SHIROKI CORPORATION, Fujisawa-shi, Kanagawa (JP)

(72) Inventors: Noriaki Maeda, Fujisawa (JP); Hidehiko Fujioka, Fujisawa (JP)

(73) Assignee: SHIROKI CORPORATION, Fujisawa-Shi, Kanagawa (JP)

( * ) Notice: Subject to any disclaimer, the term of this patent is extended or adjusted under 35 U.S.C. 154(b) by 0 days.

(21) Appl. No.: 16/368,166

(22) Filed: Mar. 28, 2019

(65) Prior Publication Data

US 2019/0299821 A1    Oct. 3, 2019

(30) Foreign Application Priority Data

Mar. 29, 2018    (JP) ................................. 2018-063926

(51) Int. Cl.
   *B60N 2/235*    (2006.01)
(52) U.S. Cl.
   CPC .................... *B60N 2/236* (2015.04)
(58) Field of Classification Search
   CPC ........................................................ B60N 2/236
   USPC ..................................................... 297/367 P
   See application file for complete search history.

(56) References Cited

U.S. PATENT DOCUMENTS

| 7,614,700 | B2* | 11/2009 | Peters | B60N 2/236 |
| | | | | 297/367 P |
| 9,682,639 | B2* | 6/2017 | Chang | B60N 2/2356 |
| 2012/0126603 | A1* | 5/2012 | Peters | B60N 2/236 |
| | | | | 297/367 P |
| 2015/0321585 | A1* | 11/2015 | McCulloch | B60N 2/2356 |
| | | | | 297/367 P |

FOREIGN PATENT DOCUMENTS

JP    5635435 B2    12/2014

\* cited by examiner

*Primary Examiner* — Anthony D Barfield
(74) *Attorney, Agent, or Firm* — Buchanan Ingersoll & Rooney PC

(57) ABSTRACT

A reclining device cylindrical first member including an internal tooth and an opening surface on one side; a main pawl including an external tooth engageable with the internal tooth; a sub-pawl including an external tooth engageable with the internal tooth; a second member stacked on an opening surface side of the first member and rotatable relative to the first member. The second member includes a pawl guide to guide the main pawl/sub-pawl between a lock position and an unlock position. A cam between the first and second members is configured to push the main pawl and sub-pawl in a lock direction; and a second cam between the cam and the main pawl is pushed by the cam at the lock position to contact the main pawl and the pawl guide.

3 Claims, 9 Drawing Sheets

RECLINING DEVICE

CROSS REFERENCE TO RELATED APPLICATION

This application claims priority from Japanese Patent Application No. 2018-063926 filed with the Japanese Patent Office on Mar. 29, 2018, the entire content of which is hereby incorporated by reference.

BACKGROUND

1. Technical Field

The present disclosure relates to a reclining device including a bottomed cylindrical first member having internal teeth at an inner cylindrical surface along a circumferential direction and having an opening surface on one side, main pawls including external teeth engageable with the internal teeth, sub-pawls including external teeth engageable with the internal tooth, a second member stacked on an opening surface side of the first member, provided rotatably relative to the first member in the circumferential direction, and having pawl guides configured to guide the main pawls or the sub-pawls between a lock position at which the external teeth of the main pawls or the sub-pawls engage with the internal teeth of the first member and an unlock position at which the external teeth of the main pawls or the sub-pawls are apart from the internal teeth, a cam provided rotatably and coaxially with the first member and the second member between the first member and the second member and configured to push the main pawls and the sub-pawls in a lock position direction, and a second cam provided between the cam and each main pawl and pushed by the cam at the lock position to contact each main pawl and each pawl guide. In a case where the main pawls and the sub-pawls are at the lock position, the external teeth of the main pawls and the internal teeth of the first member are in a fully-engaged state, and on the other hand, the external teeth of the sub-pawls and the internal teeth of the first member are in a softly-engaged state. Thus, relative rotation of the first member and the second member is restricted.

2. Description of the Related Art

One example of the reclining device is a reclining device including a bottomed cylindrical first member having an internal tooth at an inner cylindrical surface along a circumferential direction and having an opening surface on one side; a main pawl having an external tooth engageable with the internal tooth; a sub-pawl having an external tooth engageable with the internal tooth; a second member stacked on an opening surface side of the first member, provided rotatably relative to the first member in the circumferential direction, and having a pawl guide configured to guide the main pawl or the sub-pawl between a lock position at which the external tooth engages with the internal tooth and an unlock position at which the external tooth is apart from the internal tooth; a cam provided rotatably between the first member and the second member and configured to push the main pawl and the sub-pawl in a lock position direction; and a second cam provided between the cam and the main pawl and pushed by the cam at the lock position to contact the main pawl and the pawl guide. In a case where the main pawl and the sub-pawl are at the lock position, the external tooth of the main pawl and the internal tooth of the first member are in a fully-engaged state, the external tooth of the sub-pawl and the internal tooth of the first member are in a softly-engaged state, and relative rotation of the first member and the second member is restricted.

When the main pawls and the sub-pawls are moved to the lock position by the cam, the external teeth of the pair of main pawls and the internal teeth of the second member are brought into the fully-engaged state, i.e., an engagement state without looseness, and the external teeth of the pair of sub-pawls and the internal teeth of the second member are brought into the softly-engaged state, i.e., an engagement state with looseness.

Normal lock strength is obtained by engagement among the external teeth of the main pawls and the internal teeth of the second member in the fully-engaged state. In a case where a great load acts on the reclining device, the external teeth of the sub-pawls come into press-contact with the internal teeth of the second member, and therefore, the lock strength is increased as described in, e.g., Japanese Patent No. 5635435.

However, the structure of the reclining device described in Japanese Patent No. 5635435 has a problem due to variation in component accuracy of the main pawls, the sub-pawls, the cam, and the second cam when the main pawls and the sub-pawls are moved from the unlock position to the lock position by the cam. That is, there is a case where when the external teeth of the main pawls first fully engage with the internal teeth of the second member, a state in which the external teeth of the sub-pawls do not engage with the internal teeth of the second member is caused. In this state, engagement among the external teeth of the sub-pawls and the internal teeth of the second member is not made. For this reason, stable lock strength cannot be obtained.

The present disclosure has been made in view of the above-described problems. An object of the present disclosure is intended to provide a reclining device providing stable lock strength.

SUMMARY

A reclining device according to the present disclosure includes a bottomed cylindrical first member including an internal tooth at an inner cylindrical surface along a circumferential direction and having an opening surface on one side; a main pawl including an external tooth engageable with the internal tooth; a sub-pawl including an external tooth engageable with the internal tooth; a second member stacked on an opening surface side of the first member and provided rotatably relative to the first member in the circumferential direction, the second member including a pawl guide configured to guide the main pawl or the sub-pawl between a lock position at which the external tooth of the main pawl or the sub-pawl engages with the internal tooth of the first member and an unlock position at which the external tooth of the main pawl or the sub-pawl is apart from the internal tooth; a cam provided rotatably and coaxially with the first member and the second member between the first member and the second member and configured to push the main pawl and the sub-pawl in a lock position direction; and a second cam provided between the cam and the main pawl and pushed by the cam at the lock position to contact the main pawl and the pawl guide, wherein in a case where the main pawl and the sub-pawl are at the lock position, the external tooth of the main pawl and the internal tooth of the first member are in a fully-engaged state, the external tooth of the sub-pawl and the internal tooth of the first member are in a softly-engaged state, and relative rotation of the first member and the second member is restricted, and the main pawl, the sub-pawl, and the cam are formed such that the external tooth of the sub-pawl starts engaging with the internal tooth of the first member before the main pawl is brought into the fully-engaged state when the main pawl and the sub-pawl are moved from the unlock position to the lock position by the cam.

DETAILED DESCRIPTION

Figure 1:
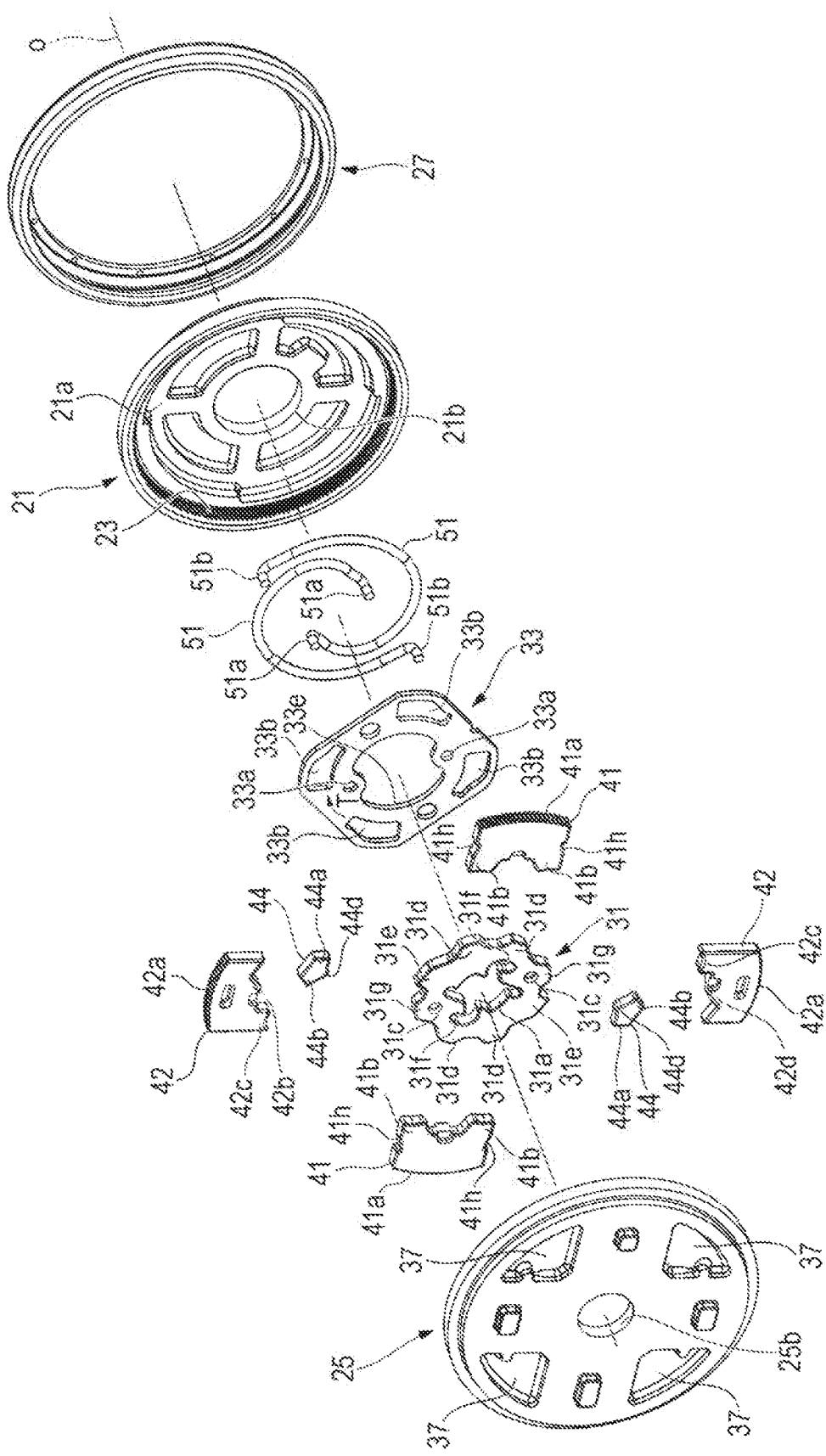
FIG. 1 is an exploded perspective view of a reclining device of the present embodiment.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

For accomplishing at least one of the above-described objects, a reclining device reflecting one aspect of the present disclosure is a reclining device comprising a bottomed cylindrical first member including an internal tooth at an inner cylindrical surface along a circumferential direction and having an opening surface on one side; a main pawl including an external tooth engageable with the internal tooth; a sub-pawl including an external tooth engageable with the internal tooth; a second member stacked on an opening surface side of the first member and provided rotatably relative to the first member in the circumferential direction, the second member including a pawl guide configured to guide the main pawl or the sub-pawl between a lock position at which the external tooth of the main pawl or the sub-pawl engages with the internal tooth of the first member and an unlock position at which the external tooth of the main pawl or the sub-pawl is apart from the internal tooth; a cam provided rotatably and coaxially with the first member and the second member between the first member and the second member and configured to push the main pawl and the sub-pawl in a lock position direction; and a second cam provided between the cam and the main pawl and pushed by the cam at the lock position to contact the main pawl and the pawl guide, wherein in a case where the main pawl and the sub-pawl are at the lock position, the external tooth of the main pawl and the internal tooth of the first member are in a fully-engaged state, the external tooth of the sub-pawl and the internal tooth of the first member are in a softly-engaged state, and relative rotation of the first member and the second member is restricted, and the main pawl, the sub-pawl, and the cam are formed such that the external tooth of the sub-pawl starts engaging with the internal tooth of the first member before the main pawl is brought into the fully-engaged state when the main pawl and the sub-pawl are moved from the unlock position to the lock position by the cam. Other characteristics of the present disclosure will be more apparent from a later-described embodiment for carrying out the disclosure and the attached drawings.

According to the reclining device of the present disclosure, the main pawls, the sub-pawls, and the cam are configured such that the external teeth of the sub-pawls start engaging with the internal teeth of the first member before the main pawls are brought into the fully-engaged state when the main pawls and the sub-pawls are moved from the unlock position to the lock position by the cam. With this configuration, a state in which only the main pawls engage with the internal teeth of the first member and the sub-pawls do not engage with the internal teeth of the first member is eliminated. Thus, stable lock strength is obtained.

Other advantageous effects of the present disclosure will be more apparent from the later-described embodiment for carrying out the disclosure and the attached drawings.

The embodiment will be described with reference to the drawings.

First, a seat provided with a reclining device of the present embodiment will be described with reference to FIG. 10. A seat 1 includes a seat cushion 2 configured to support the buttocks of a seated person, and a seatback 3 provided tiltably in a front-to-rear direction with respect to the seat cushion 2 and configured to support the back of the seated person. A reference numeral 4 indicates a reclining device provided on a rotation axis (o) of the seatback 3 in tilting thereof and configured to allow/inhibit tilting of the seatback 3.

Figure 10:
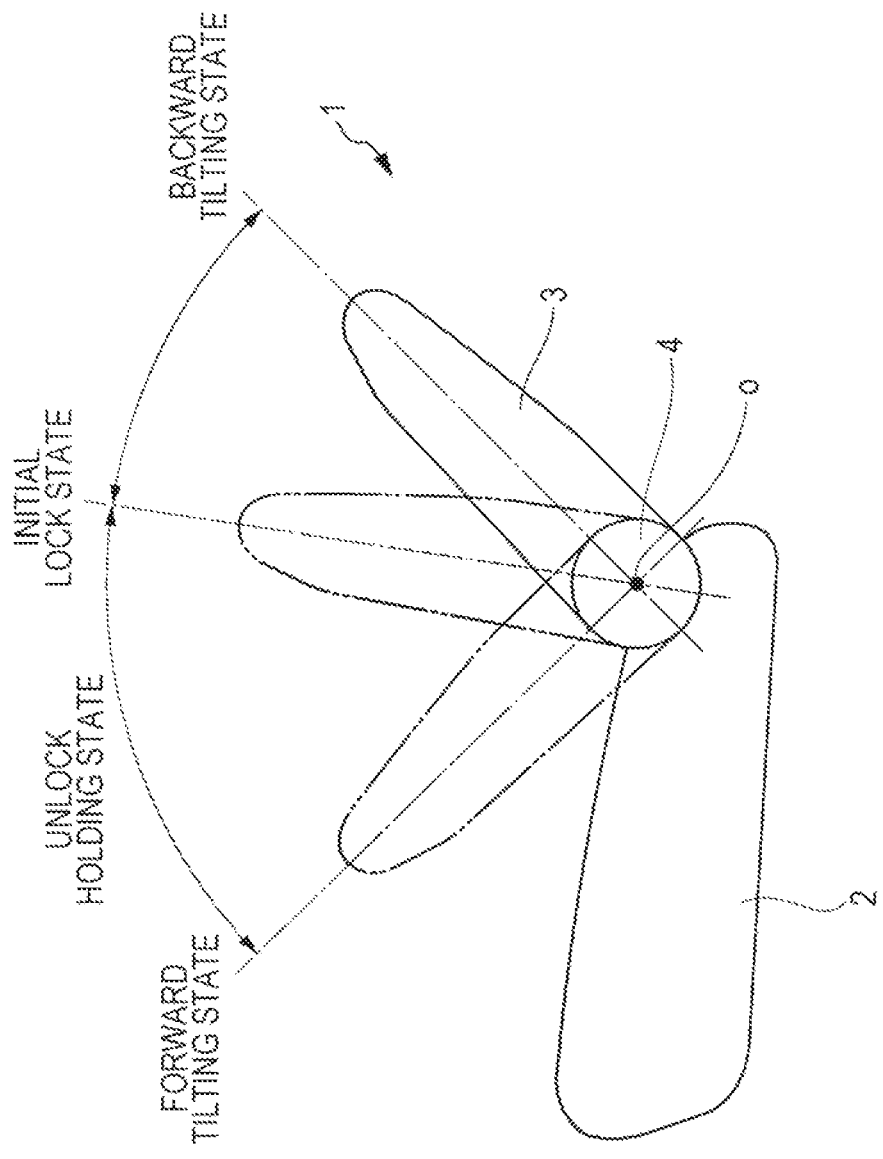
FIG. 10 is a view of a configuration of a seat provided with the reclining device of the present embodiment.

Moreover, as illustrated in FIG. 10, the reclining device 4 is tiltable within an area from a forward tilting state to a backward tilting state. In a state between an initial lock state and the backward tilting state and in the forward tilting state, tilting of the seatback 3 can be allowed or restricted by operation of a not-shown operation lever. On the other hand, in a state between the initial lock state and the forward tilting state, an unlock holding state is brought by an unlock holding mechanism. Thus, tilting of the seat cushion is allowed without operation of the operation lever.

The reclining devices of the present embodiment are each provided on the right and left sides of the seat, and have the same structure. Thus, the reclining device 4 on one side will be described below.

Figure 2:
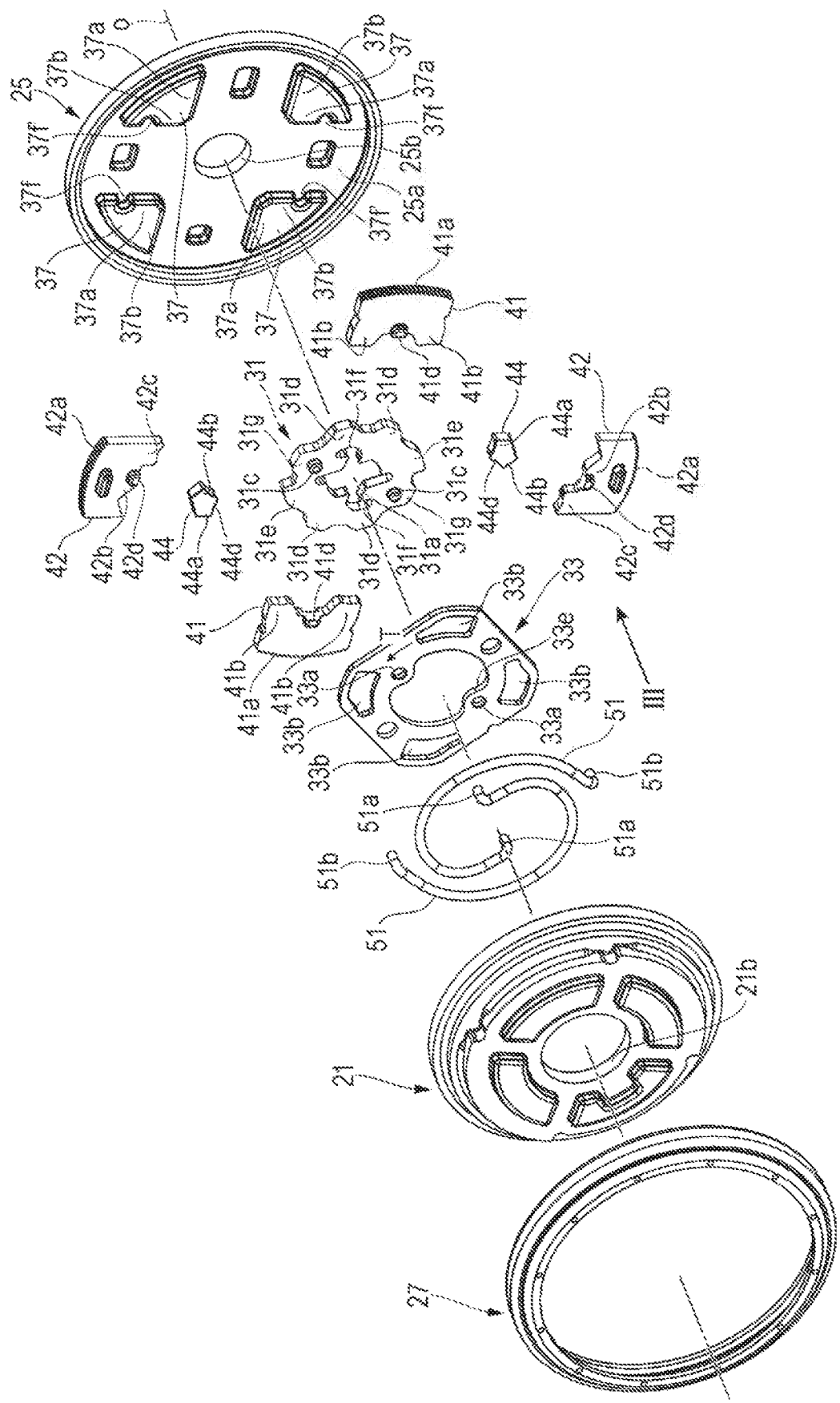
FIG. 2 is an exploded perspective view when the exploded perspective view of FIG. 1 is viewed from an opposite direction along a rotation axis of a seatback of the present embodiment in inclination thereof, the reclining device being attached to the seatback.
Figure 3:
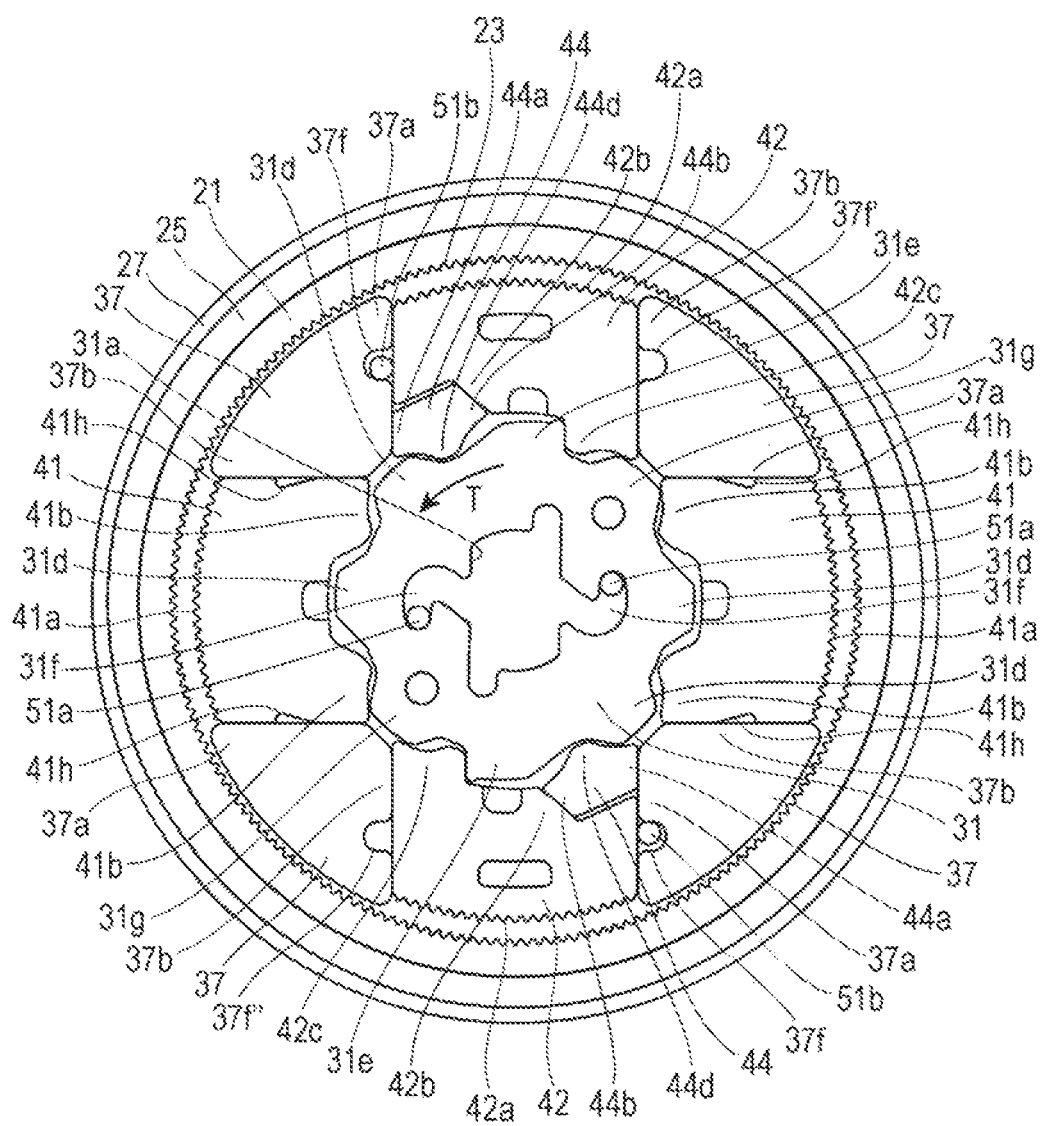
FIG. 3 is a plan view from the direction of an arrow III in FIG. 2 in a state in which part of first members, springs, and a release plate are removed from the reclining device of FIG. 2, the plan view being provided for describing an unlock state.

The reclining device will be described with reference to FIGS. 1 to 9. FIG. 1 is an exploded perspective view of a reclining device of the present embodiment. FIG. 2 is an exploded perspective view viewed from an opposite direction. FIG. 3 is a plan view from the direction of an arrow III in a state in which part of first members, springs, and a release plate are removed from the reclining device of FIG.

Figure 4:
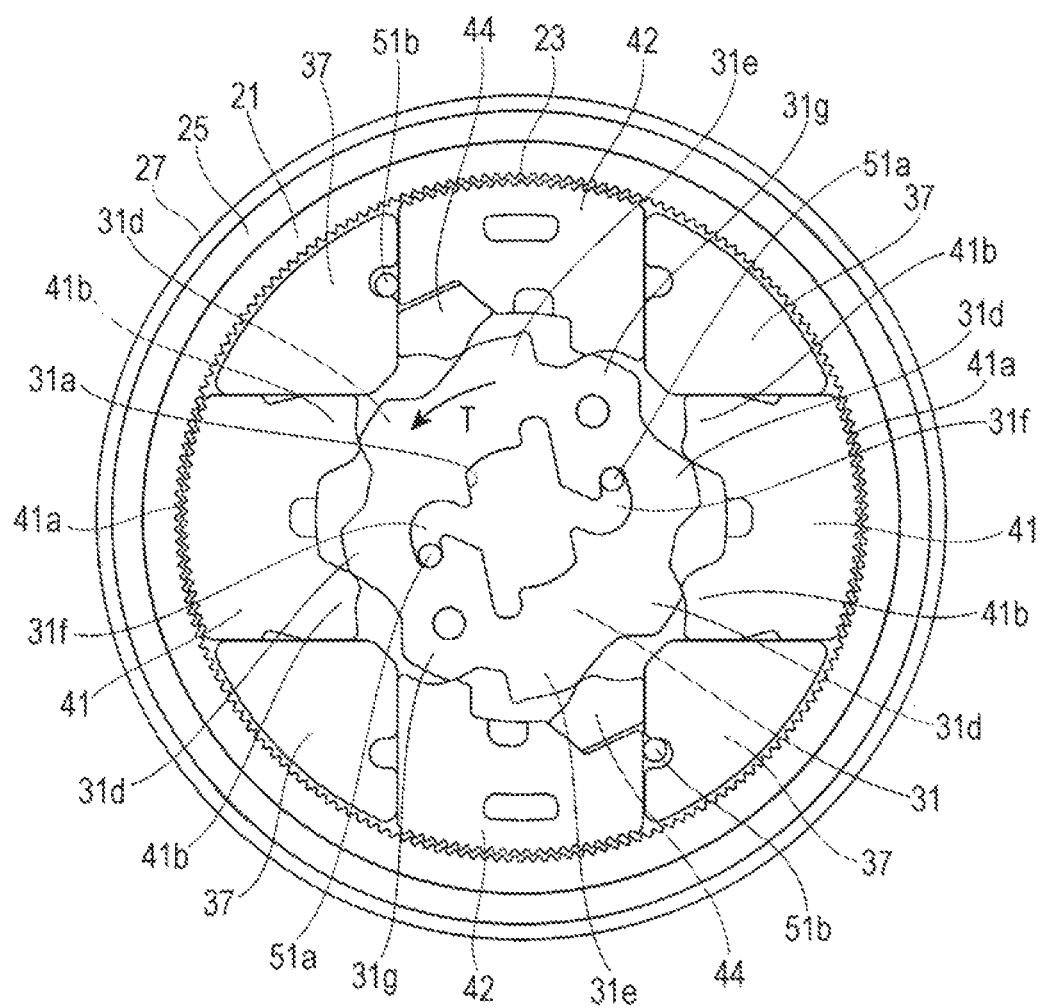
FIG. 4 is a view for describing a state in which external teeth of sub-pawls start engaging with internal teeth of a ratchet from the state of FIG. 3.
Figure 5:
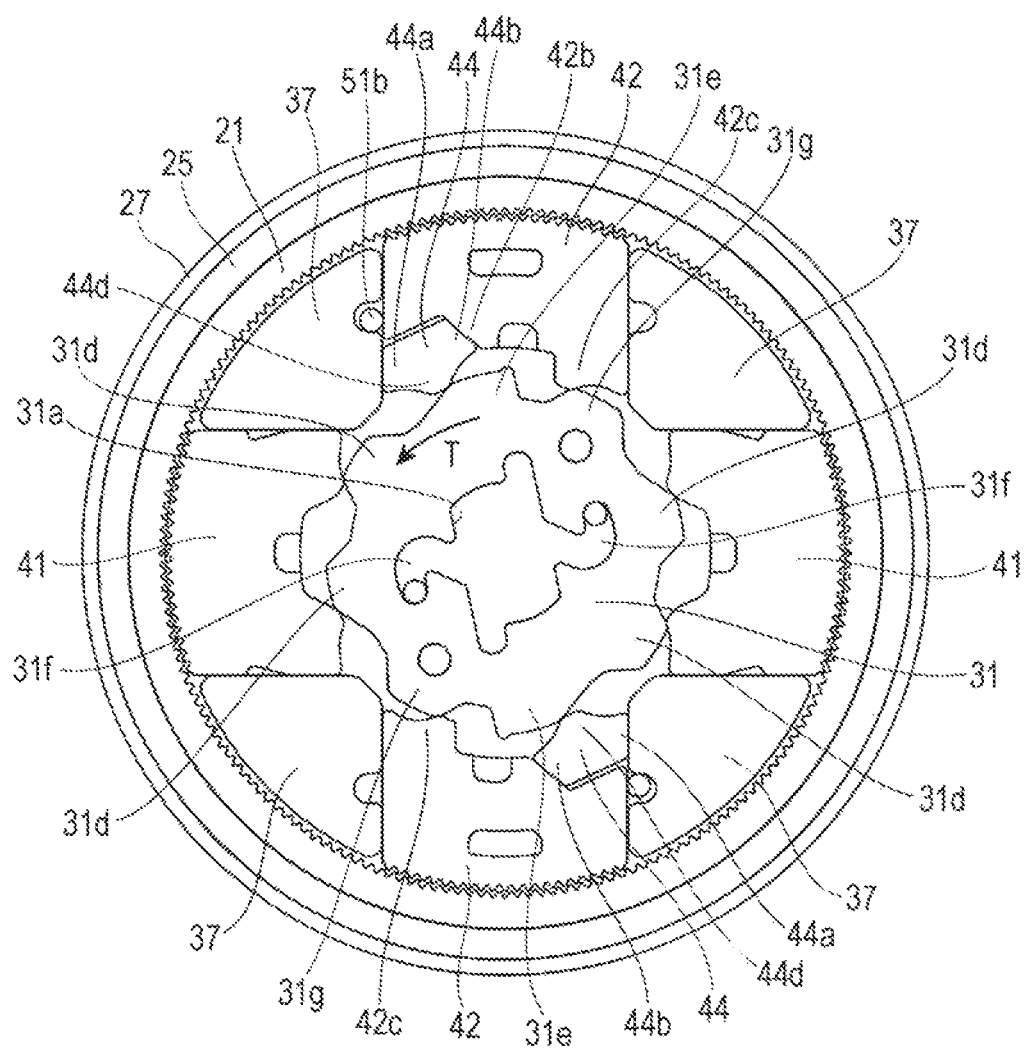
FIG. 5 is a view for describing a state in which external teeth of main pawls start engaging with the internal teeth of the ratchet from the state of FIG. 4.
Figure 6:
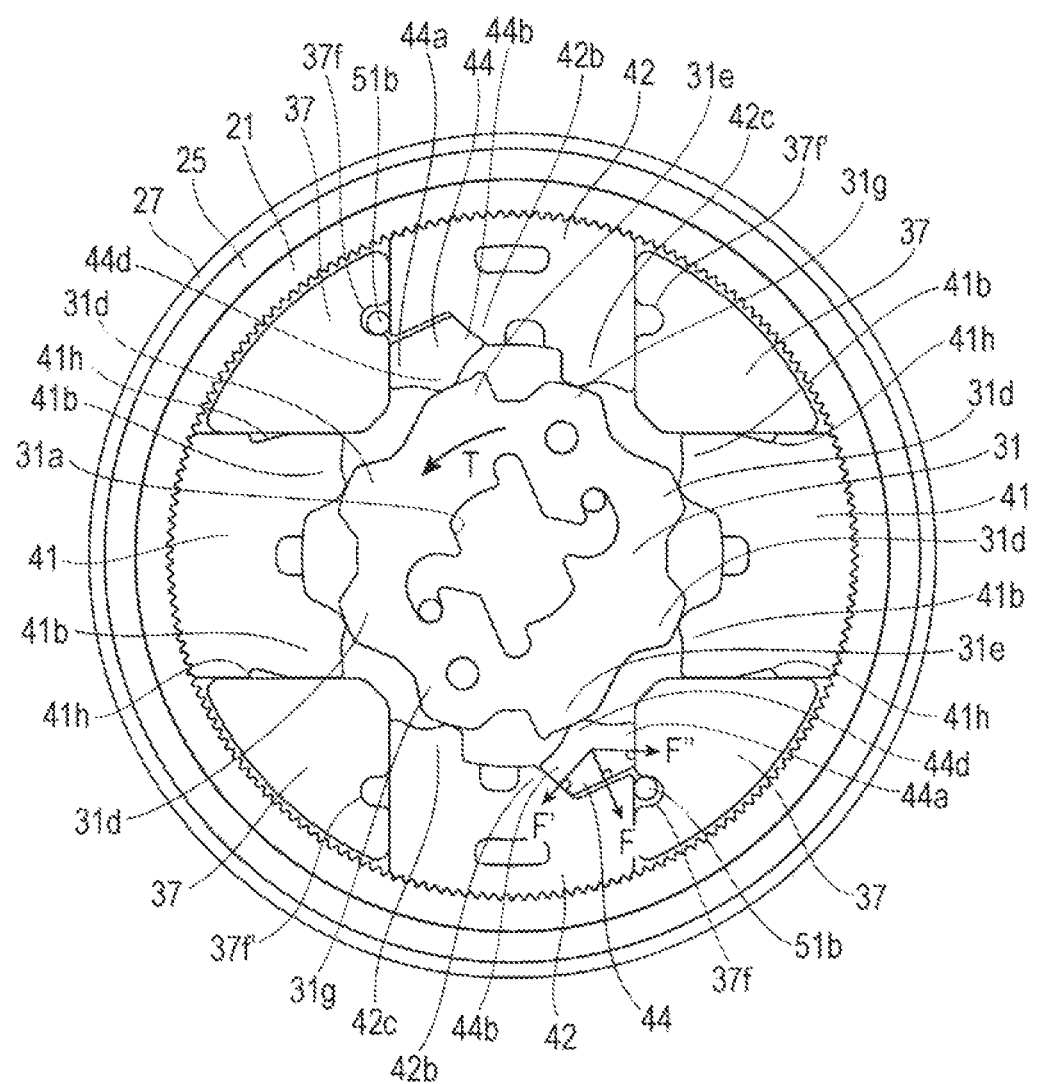
FIG. 6 is a view for describing a state in which the external teeth of the main pawls fully engage with the internal teeth of the ratchet from the state of FIG. 5.
Figure 7:
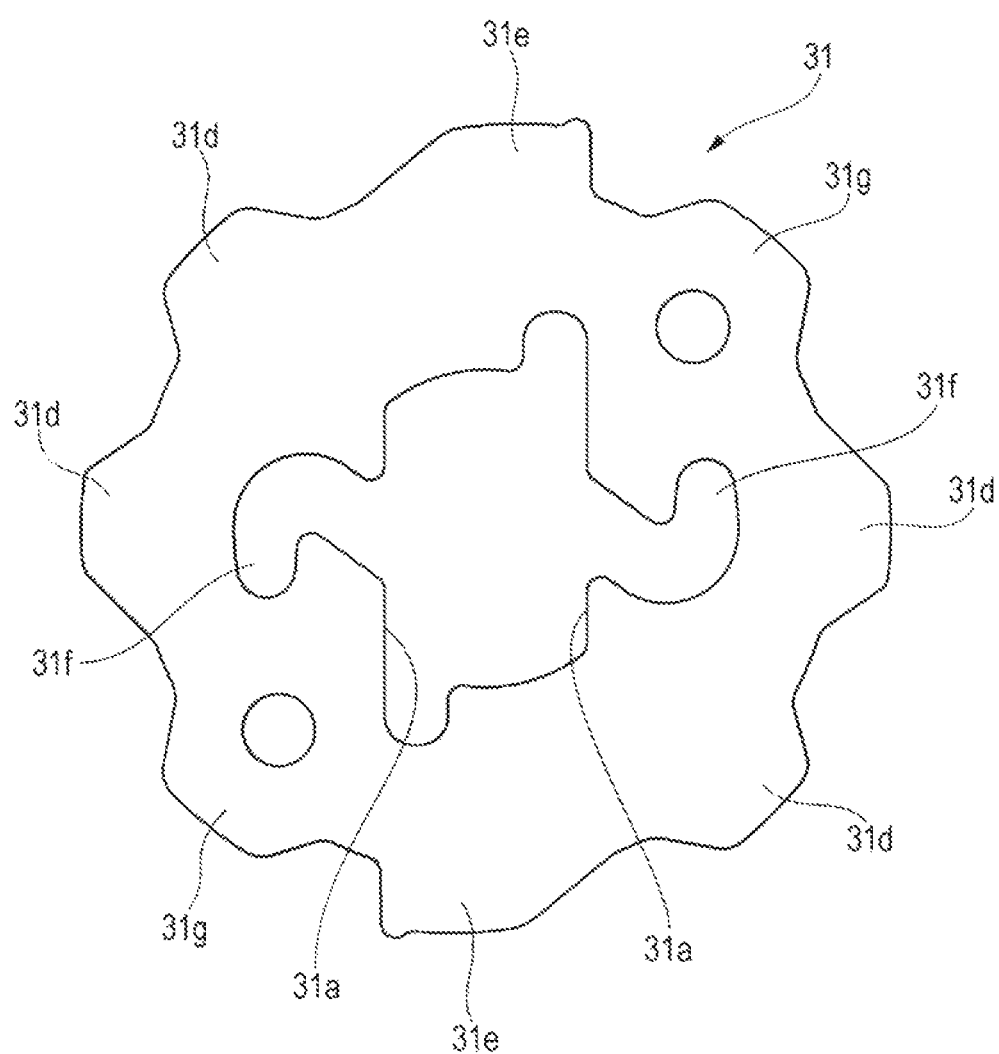
FIG. 7 is a plan view of the cam illustrated in FIG. 1.
Figure 8:
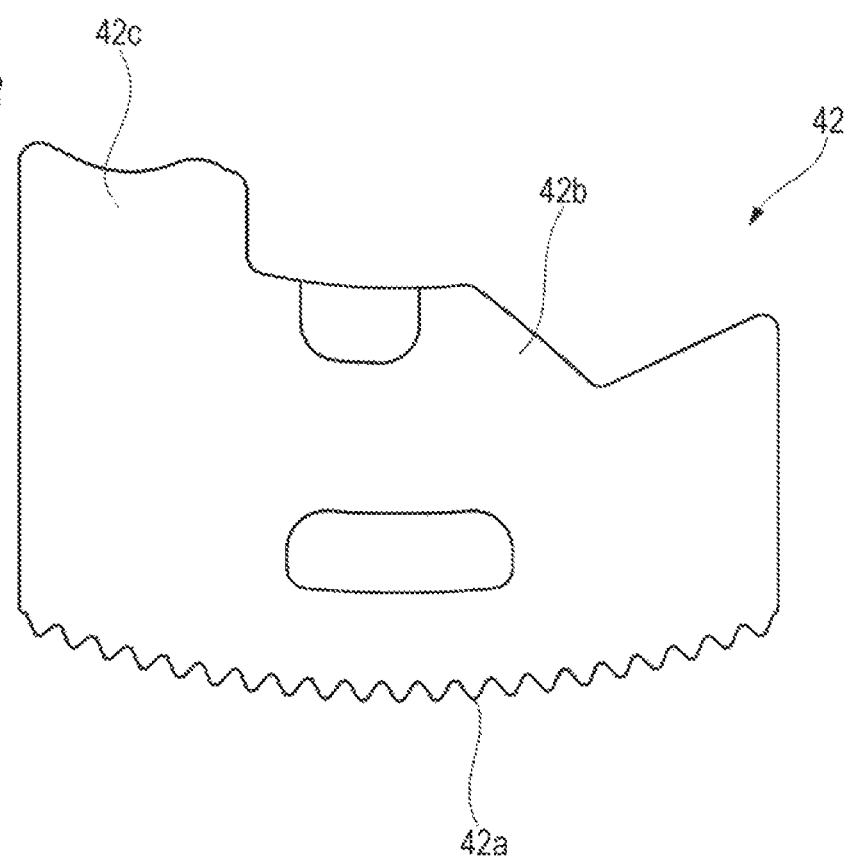
FIG. 8 is a plan view of the main pawl illustrated in FIG. 1.
Figure 9:
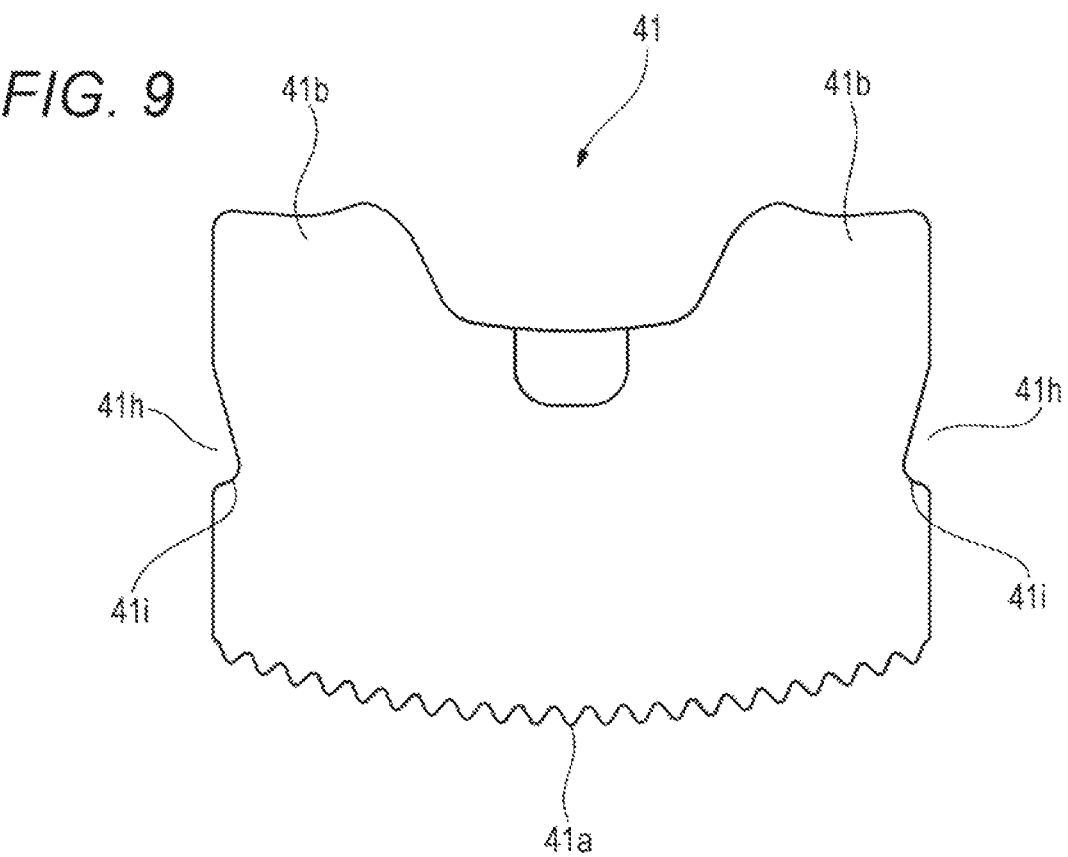
FIG. 9 is a view for describing the sub-pawl illustrated in FIG. 1.

2, the plan view being provided for describing an unlock state. FIG. 4 is a view for describing a state in which external teeth of sub-pawls start engaging with internal teeth of a ratchet from the state of FIG. 3. FIG. 5 is a view for describing a state in which external teeth of main pawls start engaging with the internal teeth of the ratchet from the state of FIG. 4. FIG. 6 is a view for describing a state in which the external teeth of the main pawls fully engage with the internal teeth of the ratchet from the state of FIG. 5. FIG. 7 is a plan view of the cam illustrated in FIG. 1. FIG. 8 is a plan view of the main pawl illustrated in FIG. 1. FIG. 9 is a view for describing the sub-pawl illustrated in FIG. 1. FIG. 10 is a view of a configuration of a seat provided with the reclining device of the present embodiment.

As illustrated in FIGS. 1 and 2, a ratchet 21 provided on a seatback 3 side, i.e., a first member, is a bottomed cylindrical member formed in such a manner that a discoid plate member is half-blanked by pressing. A circular recessed portion 21a is formed at a center portion. Internal teeth 23 are formed across an entire area of an inner peripheral surface of the circular recessed portion 21a in a circumferential direction. Moreover, a through-hole 21b into which a not-shown shaft arranged along the rotation axis of the seatback 3 in tilting thereof, i.e., the axis O in FIGS. 1 and 2, is to be loosely inserted is formed at the center of the circular recessed portion 21a. Note that the sectional shape of the not-shown shaft of the present embodiment is a non-circular shape such as a deformed oval shape in the present embodiment.

As in the ratchet 21, a base plate 25 provided on a seat cushion 2 side, i.e., a second member 25, is also formed in such a manner that a discoid plate member is half-blanked by pressing. Moreover, a circular recessed portion 25a is formed. The diameter of the circular recessed portion 25a is set slightly greater than the outer diameter of the ratchet 21. The ratchet 21 is fitted in the circular recessed portion 25a of the base plate 25, and therefore, the base plate 25 and the ratchet 21 are rotatable relative to each other. Moreover, a through-hole 25b into which the not-shown shaft is to be loosely inserted is formed coaxially with the hole 21b of the ratchet 21 at the center of the base plate 25.

An outer peripheral portion of the ratchet 21 and an outer peripheral portion of the base plate 25 are sandwiched by a ring-shaped outer peripheral ring 27. That is, the ratchet 21 and the base plate 25 are held rotatably relative to each other without separation in an axis-O direction in relative rotation. A cam 31 is arranged in a space formed in the axis-O direction between the circular recessed portion 21a of the ratchet 21 and the circular recessed portion 25a of the base plate 25. A hole 31a in which the not-shown shaft is to be fitted, i.e., a deformed oval hole in the present embodiment, is formed at the center of the cam 31. Moreover, the not-shown shaft and the cam 31 are rotatable together about the axis of the shaft. Thus, the not-shown shaft serves as a transmission member configured to transmit movement of the cam 31 of one of the reclining devices provided at both side portions of the seat 1 to the cam of the other reclining device. Moreover, two protruding portions 31c protruding in the direction of the ratchet 21 are formed at the cam 31. Further, as illustrated in FIG. 7, protruding portions in each of first to third pairs are, at opposing positions of an outer peripheral portion of the cam 31, formed in the order of two first protruding portions 31d having the same shape, two second protruding portions 31e having the same shape, and two third protruding portions 31g having the same shape in a clockwise direction in FIG. 7. Further, a pair of holes 31f to be each engaged with later-described two wire form springs 51 is formed continuously to the hole 31a of the cam 31 at opposing positions of an outer peripheral portion of the hole 31a.

As illustrated in FIGS. 1 and 2, a release plate 33 is arranged between the cam 31 and the circular recessed portion 21a of the ratchet 21. Holes 33a to be each engaged with two protruding portions 31c of the cam 31 are formed at the release plate 33. By engagement among the protruding portions 31c and the holes 33a, the cam 31 and the release plate 33 are rotatable together. Moreover, a hole 33e is formed at a center portion of the release plate 33. The center axis of the hole 33e is coincident with the center axis of the hole 31a of the cam 31.

Four pawls, i.e., two first pawls 41 as sub-pawls and two second pawls 42 as main pawls, are alternately arranged along the circumferential direction about the axis O between the release plate 33 and the circular recessed portion 25a of the base plate 25. Note that in the present embodiment, the first pawls 41 and the second pawls 42 are alternately arranged at an interval of about 90° in the circumferential direction about the axis O. That is, in FIGS. 1 and 2, the first pawls 41 are arranged at opposing positions in the horizontal direction, and the second pawls 42 are arranged at opposing positions in the vertical direction.

External teeth 41a and external teeth 42a engageable with the internal teeth 23 provided at the circular recessed portion 21a of the ratchet 21 are formed at surfaces of the first pawls 41 and the second pawls 42 facing the internal teeth 23. Further, two second cams 44 are arranged at opposing positions such that each second cam 44 is between the second pawl 42 and the cam 31 in the substantially same plane as that of these elements. As illustrated in FIG. 9, two first contact target portions 41b having the same shape and formed contactable with two first protruding portions 31d of the cam 31 are formed at a surface of the first pawl 41 opposite to a surface provided with the external teeth 41a.

Moreover, as illustrated in FIG. 8, a first contact target portion 42b contactable with the second cam 44 and a second contact target portion 42c contactable with the third protruding portion 31g of the cam 31 are formed at a surface of the second pawl 42 opposite to a surface provided with the external teeth 42a. As illustrated in FIGS. 3 to 6, a first contact target portion 44d contactable with the second protruding portion 31e of the cam 31, a guide contact portion 44a contactable with a later-described pawl guide protruding portion 37, i.e., a pawl guide, and a first contact portion 44b contactable with the first contact target portion 42b of the second pawl 42 are formed at the second cam 44.

At the circular recessed portion 25a of the base plate 25, four pawl guide protruding portions 37 are formed at an interval of 90° along a circumferential direction of a circle about the axis O in relative rotation. In the present embodiment, a peripheral surface of the first protruding portion 31d of the cam 31, i.e., a surface for pressing the first pawl (the sub-pawl) 41, is on the circumference of a circle about the center of rotation of the cam 31 as illustrated in FIG. 7. That is, the first protruding portions 31d of the cam 31 for pressing the first pawls (the sub-pawls) 41 have a constant distance to the rotation axis of the cam 31.

Next, a peripheral surface of the second protruding portion 31e of the cam 31 and a peripheral surface of the third protruding portion 31g of the cam 31 are surfaces crossing the circumference of the circle about the center of rotation of the cam 31. Further, it is set such that a distance from the center of rotation of the cam 31 increases as the cam 31 rotates in the direction of an arrow T. That is, a surface of the cam 31 for pressing the second cam 44 and a surface of the cam 31 for pressing the second pawl (the main pawl) 42 are configured such that the distance to the rotation axis of the cam 31 gradually increases toward a lock position.

The cam 31, the first pawls (the sub-pawls) 41, and the second pawls (the main pawls) 42 are formed to perform the following operation.

When the cam 31 rotates in the direction of the arrow T, the external teeth 41a of the first pawls 41 first start engaging with the internal teeth 23 of the ratchet (the first member) 21. Next, the external teeth 42a of the second pawls 42 start engaging with the internal teeth 23 of the ratchet 21. Thereafter, the second pawls 42 are continuously pushed in the direction of the internal teeth 23 by the cam 31. Meanwhile, the first pawls 41 are not pushed in the direction of the internal teeth 23, and stay at such a position. Then, at the lock position, the cam 31 pushes the second pawls 42 while the second cams 44 push the second pawls 42. Accordingly, the external teeth 42a of the second pawls 42 and the internal teeth 23 of the ratchet 21 are brought into a fully-engaged state, i.e., an engagement state without looseness. Moreover, the external teeth 41a of the first pawls 41 and the internal teeth 23 of the ratchet 21 are brought into a softly-engaged state, i.e., an engagement state with looseness.

In other words, the cam 31 allows the external teeth 41a of the first pawls 41 to start engaging with the internal teeth 23 of the ratchet 21 before the second pawls 42 are brought into the fully-engaged state while the second pawls 42 and the first pawls 41 are moving from an unlock position to the lock position.

Note that in the present specification, a state in which the external teeth 42a, 41a of the second pawls (the main pawls) 42 and the first pawls (the sub-pawls) 41 each engage with the internal teeth 23 of the ratchet (the first member) 21 and are unable to move in any of a lock direction and an unlock direction, i.e., the engagement state without looseness (a clearance), is referred to as the "fully-engaged state." Moreover, a state in which slight movement is allowed in one or both of the lock direction and the unlock direction, i.e., the engagement state with looseness (a clearance), is referred to as the "softly-engaged state."

By two adjacent pawl guide protruding portions 37 provided at the circular recessed portion 25a of the base plate 25, the first pawl 41 and the second pawl 42 are movable only in a radial direction of the circle about the axis O in relative rotation. That is, the pawl guide protruding portions 37 guide the first pawl 41 and the second pawl 42 between the lock position at which the external teeth 41a and the external teeth 42a engage with the internal teeth 23 of the ratchet 21 and the unlock position at which the external teeth 41a and the external teeth 42a are apart from the internal teeth 23 of the ratchet 21.

A protruding portion 41d and a protruding portion 42d protruding in the direction of the release plate 33 are each formed at surfaces of the first pawl 41 and the second pawl 42 facing the release plate 33. Cam holes 33b each engageable with the protruding portions 41d of the first pawls 41 and the protruding portions 42d of the second pawls 42 are formed at the release plate 33. Inclined surfaces each contactable with the protruding portions 41d of the first pawls 41 and the protruding portions 42d of the second pawls 42 are formed at the cam holes 33b. The shape of the inclined surface is set to such a shape that when the release plate 33 rotates in the opposite direction of the direction of the arrow T in FIGS. 1 and 2 in the lock state, the external teeth 41a of the first pawls 41 and the external teeth 42a of the second pawls 42 move, along the pawl guide protruding portions 37, the first pawls 41 and the second pawls 42 in a direction (an unlock position direction) apart from the internal teeth 23 of the ratchet 21.

Two wire form springs 51 curved in a substantially C-shape are arranged between the release plate 33 and the circular recessed portion 21a of the ratchet 21.

At adjacent two pawl guide protruding portions (two pawl guides) 37 provided to sandwich side portions of the first pawl 41 and the second pawl 42, a first pawl guide 37a facing one side portion of the first pawl 41 and the second pawl 42 and a second pawl guide 37b facing the other side portion of the first pawl 41 and the second pawl 42 are formed.

In the present embodiment, the strength of the pawl guide protruding portion 37 is set lower than that of the first pawl 41.

Recessed portions 41h are formed at surfaces of the first pawl 41 facing the first pawl guide 37a and the second pawl guide 37b. It is configured such that when the ratchet 21 rotates to push the first pawls 41 against the pawl guide protruding portions 37, portions of the pawl guide protruding portions 37 deformed due to a great load on the seatback 3 can enter these recessed portions.

As illustrated in FIG. 9, the recessed portion 41h is configured deeper on an external tooth 41a side than on a cam 31 side. A pressing portion 41i contactable with the deformed portion of the pawl guide protruding portion 37 having entered the recessed portion 41h upon action of the above-described great load is formed at the recessed portion 41h on the external tooth 41a side. Due to such contact, movement of the first pawl 41 in the unlock direction is inhibited.

As illustrated in FIG. 3, a recessed portion 37f for forming a space between the first pawl guide 37a and one side portion of the second pawl 42 is formed at a surface of the first pawl guide 37a facing one side portion of the second pawl 42. Note that in the present embodiment, a recessed portion 37f forming a space between the second pawl guide 37b and the other side portion of the second pawl 42 is also formed at the second pawl guide 37b facing the other side portion of the second pawl 42.

A first end portion 51a bent toward the base plate 25 in an O-axis direction is formed at one end side of each of two wire form springs 51. Moreover, a second end portion 51b bent toward the base plate 25 is formed on the other end side.

In a state in which the wire form spring 51 is elastically deformed, the first end portion 51a is fitted in the hole 31f formed at the cam 31 through the hole 33e of the release plate 33. Moreover, the second end portion 51b is inserted into the recessed portion 37f of the first pawl guide 37a.

Due to elastic repulsive force of the wire form spring 51, the first end portion 51a of the wire form spring 51 presses an inner wall surface of the hole 31f of the cam 31. Then, the first protruding portions 31d, the second protruding portions 31e, and the third protruding portions 31g of the cam 31 are each biased in a direction (one direction) facing the first contact target portions 41b of the first pawls 41, the second contact target portions 42c of the second pawls 42, and the first contact target portions 44d of the second cams 44.

The second end portion 51b inserted into the recessed portion 37f of the first pawl guide 37a presses one side portion of the second pawl 42. Thus, the second pawl 42 is pressed in the direction of the second pawl guide 37b facing the other side portion of the second pawl 42. Note that in the present embodiment, the wire form spring 51 constantly presses the second pawl 42 against the second pawl guide 37b facing the other side portion of the second pawl 42 even during movement of the second pawl 42 from the lock state to the unlock state and vice versa.

Moreover, in the present embodiment, by fitting (insertion) of the second end portion 51b of the wire form spring 51 in the recessed portion 37f of the pawl guide protruding portion 37, the second end portion 51b of the wire form spring 51 directly presses and biases one side portion of the second pawl 42. A space (a clearance) is present on a side opposite to a surface pressed by the second end portion 51b of the wire form spring 51. Due to such a space, the second end portion 51b is movable in a direction away (separated) from one side portion of the second pawl 42 when a force of equal to or higher than biasing force acts on the second end portion 51b of the wire form spring 51 in a direction different from that of the biasing force.

In a case where the first pawls 41 and the second pawls 42 are at the lock position, the second cams 44 receiving force F from the cam 31 press the second pawls 42 in a lock position direction with component force F' of the force F as illustrated in FIG. 6. At the same time, the second pawls 42 are pressed against the second pawl guides 37b of the pawl guide protruding portions 37. Moreover, the second cams press, with component force F" of the force F, the first pawl guides 37a of the pawl guide protruding portions 37.

Operation of the reclining device having the above-described configuration will be described herein.

(Case of Moving First Pawls and Second Pawls from Lock Position to Unlock Position)

As illustrated in FIG. 6, the first pawls 41 and the second pawls 42 provided at the base plate 25 through the cam 31 are, due to the elastic repulsive force of the wire form springs 51, at the lock position at which the external teeth 41a and the external teeth 42a engage with the internal teeth 23 of the ratchet 21. In this state, relative rotation of the ratchet (the first member) 21 and the base plate (the second member) 25 is restricted. With this configuration, the seatback 3 is in such a state (the lock state) that the seatback 3 is unable to rotate about the axis O relative to the seat cushion 2.

The cam 31 is operated to rotate in the other direction (a direction opposite to the arrow T) against the biasing force of the wire form springs 51. Accordingly, the release plate 33 rotates together because the protruding portions 31c of the cam 31 and the holes 33a of the release plate 33 engage with each other. In this state, pressing of the first contact target portions 41b of the first pawls 41 by the first protruding portions 31d of the cam 31, pressing of the first contact target portions 44d of the second cams 44 by the second protruding portions 31e of the cam 31, and pressing of the second contact target portions 42c of the second pawls 42 by the third protruding portions 31g of the cam 31 are cancelled.

When the release plate 33 further rotates, the first pawls 41 and the second pawls 42 (and the second cams 44) are, by the inclined surfaces of the cam holes 33b of the release plate 33 engaging with the protruding portions 41d of the pawls 41, moved to the unlock position at which the external teeth 41a and the external teeth 42a disengage from the internal teeth 23 of the ratchet 21. As a result, relative rotation of the ratchet (the first member) 21 and the base plate (the second member) 25 is allowed as illustrated in FIG. 3. With this configuration, the seatback 3 is brought into such a state (the unlock state) that the seatback 3 is rotatable relative to the seat cushion 2. At this point, the second pawls 42 are pressed against the second pawl guides 37b by the second end portions 51b of the wire form springs 51.

(Case of Moving First Pawls and Second Pawls from Unlock Position to Lock Position)

In the unlock state illustrated in FIG. 3, when operation force for the cam 31 is released, the cam 31 and the release plate 33 rotate in the direction of the arrow T due to the biasing force of the wire form springs 51.

First, at least one of two first protruding portions 31d of the cam 31 presses two first contact target portions 41b of the first pawls 41 as illustrated in FIG. 4. Accordingly, the external teeth 41a of the first pawls (the sub-pawls) 41 start engaging with the internal teeth 23 of the ratchet 21. Note that the phrase of "start engaging" indicates that the external teeth and the internal teeth start overlapping with each other in the circumferential direction".

When the cam 31 further rotates, the third protruding portions 31g of the cam 31 press the second contact target portions 42c of the second pawls 42 as illustrated in FIG. 5. Then, the external teeth 42a of the second pawls (the main pawls) 42 start engaging with the internal teeth 23 of the ratchet 21. Note that the second protruding portions 31e of the cam 31 also start pressing the first contact target portions 44d of the second cams 44. However, the first contact portions 44b of the second cams 44 do not press the first contact target portions 42b of the second pawls 42.

When the cam 31 further rotates, the external teeth 42a of the second pawls (the main pawls) 42 and the internal teeth 23 of the ratchet (the first member) 21 are, as illustrated in FIG. 6, brought into the fully-engaged state by pressing of the second contact target portions 42c of the second pawls 42 by the third protruding portions 31g of the cam 31 and pressing of the first contact target portions 42b of the second pawls 42 by the first contact portions 44b of the second cams 44. Meanwhile, the external teeth 41a of the first pawls (the sub-pawls) 41 and the internal teeth 23 of the ratchet (the first member) 21 are brought into the softly-engaged state.

More specifically, two first protruding portions 31d of the cam 31 as the surfaces for pressing two first contact target portions 41b of the first pawls (the sub-pawls) 41 have the constant distance to the rotation axis of the cam 31. In the lock state illustrated in FIG. 6, the shapes of the cam 31 and the first pawls 41 are set such that no matter how much the cam 31 rotates in the direction of the arrow T, the external teeth 41a of the first pawls (the sub-pawls) 41 and the internal teeth 23 of the ratchet (the first member) 21 are brought into the softly-engaged state. Note that the first pawls 41 and the internal teeth 23 seem to be in the fully-engaged state in FIG. 6, but looseness (a clearance) allowing slight movement in the lock/unlock direction is actually provided.

The second protruding portions 31e of the cam 31 as the surfaces for pressing the second cams 44 and the third protruding portions 31g as the surfaces for pressing the second pawls (the main pawls) 42 are configured such that the distance to the rotation axis of the cam 31 gradually increases toward the lock position. Thus, by rotation of the cam 31 in the direction of the arrow T, the external teeth 42a of the second pawls (the main pawls) 42 and the internal teeth 23 of the ratchet (the first member) 21 are brought into the fully-engaged state.

According to the present embodiment, the following advantageous effects are obtained.

(1) The second pawls (the main pawls) 42, the first pawls (the sub-pawls) 41, and the cam 31 are formed such that the first pawls 41 start engaging with the internal teeth 23 of the ratchet 21 before full engagement of the second pawls 42 with the internal teeth 23 of the ratchet 21. With this configuration, only the external teeth 42a of the second pawls 42 fully engage with the internal teeth 23 of the ratchet 21. Thus, a state in which the external teeth 41a of the first pawls 41 do not engage with the internal teeth 23 of the ratchet 21 at all is eliminated, and therefore, stable lock strength is obtained.

(2) The second pawls (the main pawls) 42, the first pawls (the sub-pawls) 41, and the cam 31 are configured such that the external teeth 41a of the first pawls (the sub-pawls) 41 first start engaging with the internal teeth 23 of the ratchet (the first member) 21. Next, the external teeth 42a of the second pawls (the main pawls) 42 start engaging with the internal teeth 23 of the ratchet 21. With this configuration, more stable lock strength is obtained.

(3) The configuration in which the first pawls 41 are brought into the softly-engaged state and the second pawls 42 are brought into the fully-engaged state at the lock position can be realized by the shape of the cam 31 having the first protruding portions 31d, the second protruding portions 31e, and the third protruding portions 31g. Thus, formation is facilitated.

(4) The second pawls 42 are arranged diagonally in an upper-to-lower direction. Thus, engagement without looseness is made in the upper-to-lower direction, and therefore, no rattling due to vibration in the front-to-rear direction occurs.

The present disclosure is not limited to the above-described embodiment.

For example, the embodiment has been described above regarding four pawls, but three pawls may be employed. In this case, two of three pawls are preferably the second pawls, and the second pawls and the second cams are preferably provided diagonally.

Five or more pawls may be employed. In this case, at least two second cams are preferably provided, and the second cams in one pair are preferably arranged diagonally.

The reclining device according to the present disclosure may be the following first to fourth reclining devices.

The above-described first reclining device is a reclining device including a bottomed cylindrical first member having an internal tooth at an inner cylindrical surface along a circumferential direction and having an opening surface on one side; a main pawl having an external tooth engageable with the internal tooth; a sub-pawl having an external tooth engageable with the internal tooth; a second member stacked on an opening surface side of the first member, provided rotatably relative to the first member in the circumferential direction, and having a pawl guide configured to guide the main pawl or the sub-pawl between a lock position at which the external tooth engages with the internal tooth and an unlock position at which the external tooth is apart from the internal tooth; a cam provided rotatably between the first member and the second member and configured to push the main pawl and the sub-pawl in a lock position direction; and a second cam provided between the cam and the main pawl and pushed by the cam at the lock position to contact the main pawl and the pawl guide. In a case where the main pawl and the sub-pawl are at the lock position, the external tooth of the main pawl and the internal tooth of the first member are in a fully-engaged state, the external tooth of the sub-pawl and the internal tooth of the first member are in a softly-engaged state, and relative rotation of the first member and the second member is restricted. The main pawl, the sub-pawl, and the cam are formed such that the external tooth of the sub-pawl starts engaging with the internal tooth of the first member before the main pawl is brought into the fully-engaged state when the main pawl and the sub-pawl are moved from the unlock position to the lock position by the cam.

The above-described second reclining device is the above-described first reclining device in which it is configured such that when the main pawl and the sub-pawl are moved from the unlock position to the lock position by the cam, the external tooth of the sub-pawl first starts engaging with the internal tooth of the first member, and the external tooth of the main pawl subsequently starts engaging with the internal tooth of the first member.

The above-described third reclining device is the above-described first or second reclining device in which a surface of the cam for pressing the sub-pawl has a constant distance to a rotation axis of the cam.

The above-described fourth reclining device is any one of the above-described first to third reclining devices in which a surface of the cam for pressing the second cam is configured such that the distance to the rotation axis of the cam gradually increases toward the lock position.

The foregoing detailed description has been presented for the purpose of illustration and description. Many modification and variations are possible in light of the above teaching. It is not intended to be exhaust or to limit the subject matter described herein to the precise form disclosed. Although the subject matter has been described in language specific to structural features and/or methodological acts, it is to be understood that the subject matter defined in the appended claims in not necessarily limited to the specific features or acts described above. Rather, the specific features and acts described above are disclosed as example forms of implementing the appended hereto.

What is claimed is:

1. A reclining device comprising:
 a bottomed cylindrical first member including an internal tooth at an inner cylindrical surface along a circumferential direction and having an opening surface on one side;
 a main pawl including an external tooth engageable with the internal tooth;
 a sub-pawl including an external tooth engageable with the internal tooth;
 a second member stacked on an opening surface side of the first member and provided rotatably relative to the first member in the circumferential direction, the second member including a pawl guide configured to guide the main pawl or the sub-pawl between a lock position at which the external tooth of the main pawl or the sub-pawl engages with the internal tooth of the first member and an unlock position at which the external tooth of the main pawl or the sub-pawl is apart from the internal tooth;
 a cam provided rotatably and coaxially with the first member and the second member between the first member and the second member and configured to push the main pawl and the sub-pawl in a lock position direction; and
 a second cam provided between the cam and the main pawl and pushed by the cam at the lock position to contact the main pawl and the pawl guide,
 wherein in a case where the main pawl and the sub-pawl are at the lock position, the external tooth of the main pawl and the internal tooth of the first member are in a fully-engaged state, the external tooth of the sub-pawl and the internal tooth of the first member are in a softly-engaged state, and relative rotation of the first member and the second member is restricted, the main pawl, the sub-pawl, and the cam are formed such that the external tooth of the sub-pawl starts engaging with the internal tooth of the first member before the main pawl is brought into the fully-engaged state when the main pawl and the sub-pawl are moved from the unlock position to the lock position by the cam, and when the main pawl and the sub-pawl are moved from the unlock position to the lock position by the cam, the external tooth of the sub-pawl first starts engaging with the internal tooth of the first member, and the external tooth of the main pawl subsequently starts engaging with the internal tooth of the first member.

2. The reclining device according to claim 1, wherein a surface of the cam for pressing the sub-pawl has a constant distance to a rotation axis of the cam.

3. The reclining device according to claim 1, wherein a surface of the cam for pressing the second cam is configured such that a distance to a rotation axis of the cam gradually increases toward the lock position.

* * * * *